United States Patent [19]

Kesler et al.

[11] Patent Number: 5,065,968
[45] Date of Patent: Nov. 19, 1991

[54] ELECTRICAL BOX MOUNTING APPARATUS

[75] Inventors: Gregory J. Kesler; Kenneth R. Schnell, both of South Bend, Ind.

[73] Assignee: Hubbell Incorporated, Orange, Conn.

[21] Appl. No.: 603,224

[22] Filed: Oct. 25, 1990

[51] Int. Cl.⁵ .............................................. A47B 96/06
[52] U.S. Cl. .................................. 248/205.1; 174/58; 220/3.9; 248/906
[58] Field of Search ................ 248/205.1, 906, 27.1; 174/58, 63, 48; 220/3.9, 3.92, 3.3, 3.4, 3.7; 52/221; 361/356, 357

[56] References Cited

U.S. PATENT DOCUMENTS

| | | | |
|---|---|---|---|
| 1,754,849 | 4/1930 | Clayton | 248/906 X |
| 3,176,869 | 4/1965 | Kinney | 220/3.9 |
| 3,215,831 | 11/1965 | Gladsden | 174/58 X |
| 3,606,223 | 9/1971 | Havener | 248/205.1 |
| 3,913,773 | 10/1975 | Copp | 220/3.92 |
| 3,926,330 | 12/1975 | Deming | 220/3.9 |
| 4,062,470 | 12/1977 | Boteler | 248/906 X |
| 4,165,851 | 8/1979 | Bowden | 248/906 X |
| 4,194,644 | 3/1980 | Narvaez | 248/906 X |
| 4,712,157 | 12/1987 | Simonson | 361/357 |

Primary Examiner—J. Franklin Foss
Attorney, Agent, or Firm—Jerry M. Presson; Walter C. Farley

[57] ABSTRACT

An electrical box is formed with an elongated channel in its back surface and brackets straddling the channel. The elongated U-shaped part of a hanger bar is inserted through the brackets and in the channel and is retained by a transverse rib which frictionally engages the hanger bar. Nail-receiving ears are provided on the sides of the box.

6 Claims, 4 Drawing Sheets

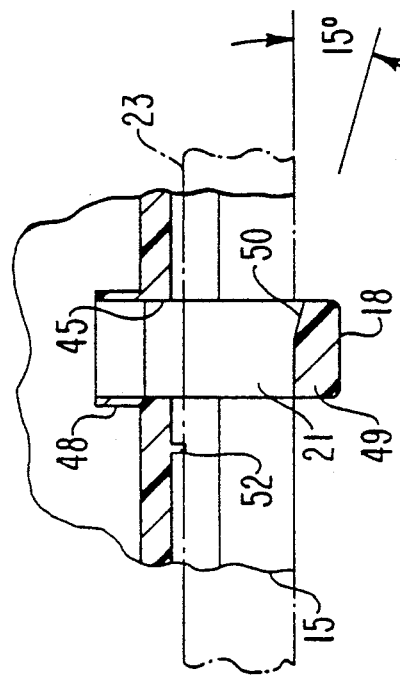
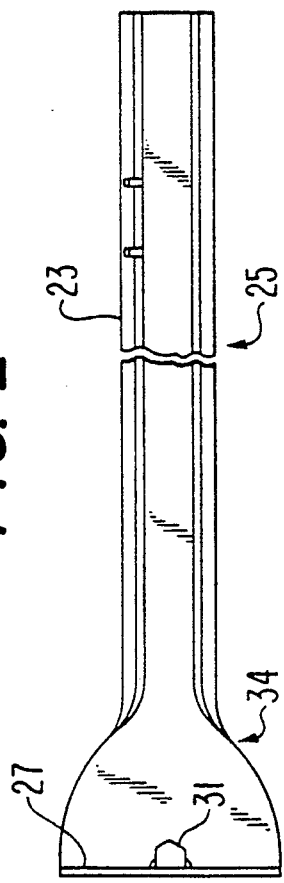
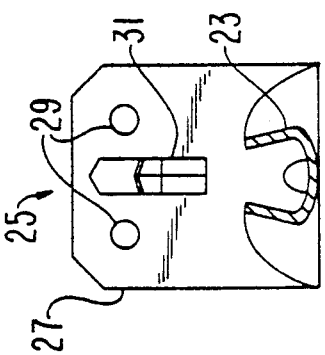
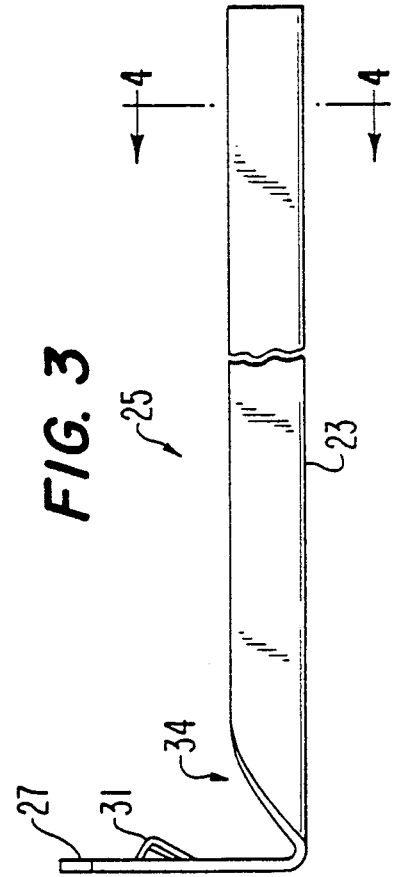
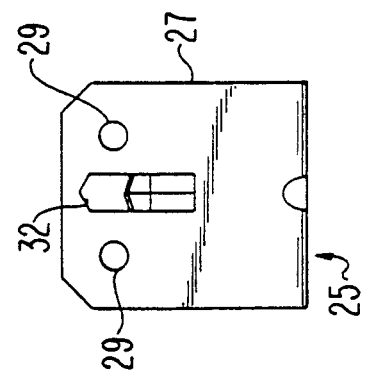

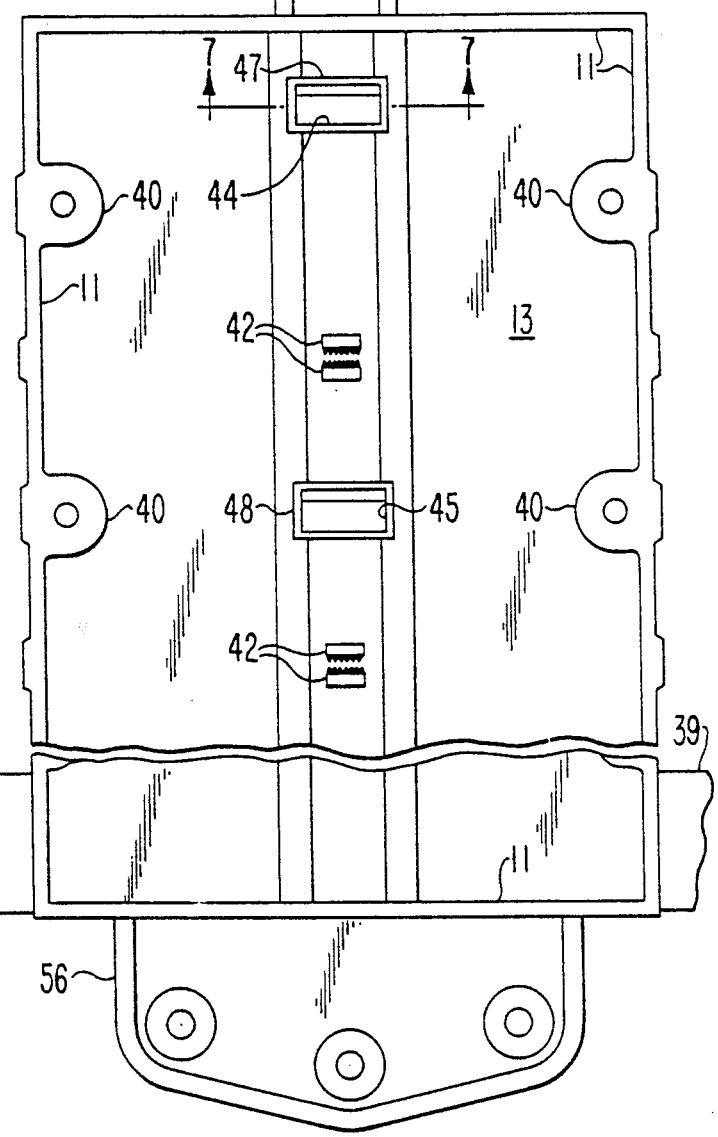

ELECTRICAL BOX MOUNTING APPARATUS

This invention relates to an apparatus for mounting an electrical box.

BACKGROUND OF THE INVENTION

Mounting an electrical box in an existing structure or a new construction always presents certain problems of finding ways to attach the box to nearby structural members so that the box is solidly held and so that it is in the desired location. While many arrangements have been devised for mounting electrical boxes adjacent a vertical stud or the like, particular problems are presented when the vertical stud is not adjacent the desired location for the box.

SUMMARY OF THE INVENTION

Accordingly, an object of this invention is to provide a unique and advantageous mounting arrangement for an electrical box, particularly a multi-gang box, in a wall, ceiling or the like of a building.

Briefly described, the invention comprises an apparatus for mounting an electrical box in a building wall or the like, the box being of the type having side walls, a back wall and open front, the apparatus comprising the combination of a generally L-shaped hanger having an end adapted to be attached to a structural member in the building wall and an elongated leg of substantially uniform cross section. Means on the back wall of the box defines first and second openings dimensioned to receive the elongated leg therethrough, the openings being aligned with each other along an axis generally parallel with the back wall. The box is also provided with means for frictionally engaging the elongated leg extending through the openings.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein:

FIG. 2 is a front elevation of a hanger bar usable in the apparatus of FIG. 1;

FIG. 3 is a side elevation of the hanger bar of FIG. 2;

FIG. 4 is a sectional view along line 4—4 of FIG. 3;

FIG. 5 is an end elevation of the hanger bar of FIGS. 2 and 5;

FIG. 6 is a front elevation of the apparatus of FIG. 1;

FIG. 7 is a transverse sectional view along line 7—7 of FIG. 6;

FIG. 9 is a sectional view, somewhat enlarged, along line 9—9 of FIG. 8.

DESCRIPTION OF THE PREFERRED EMBODIMENT

Figure 1:
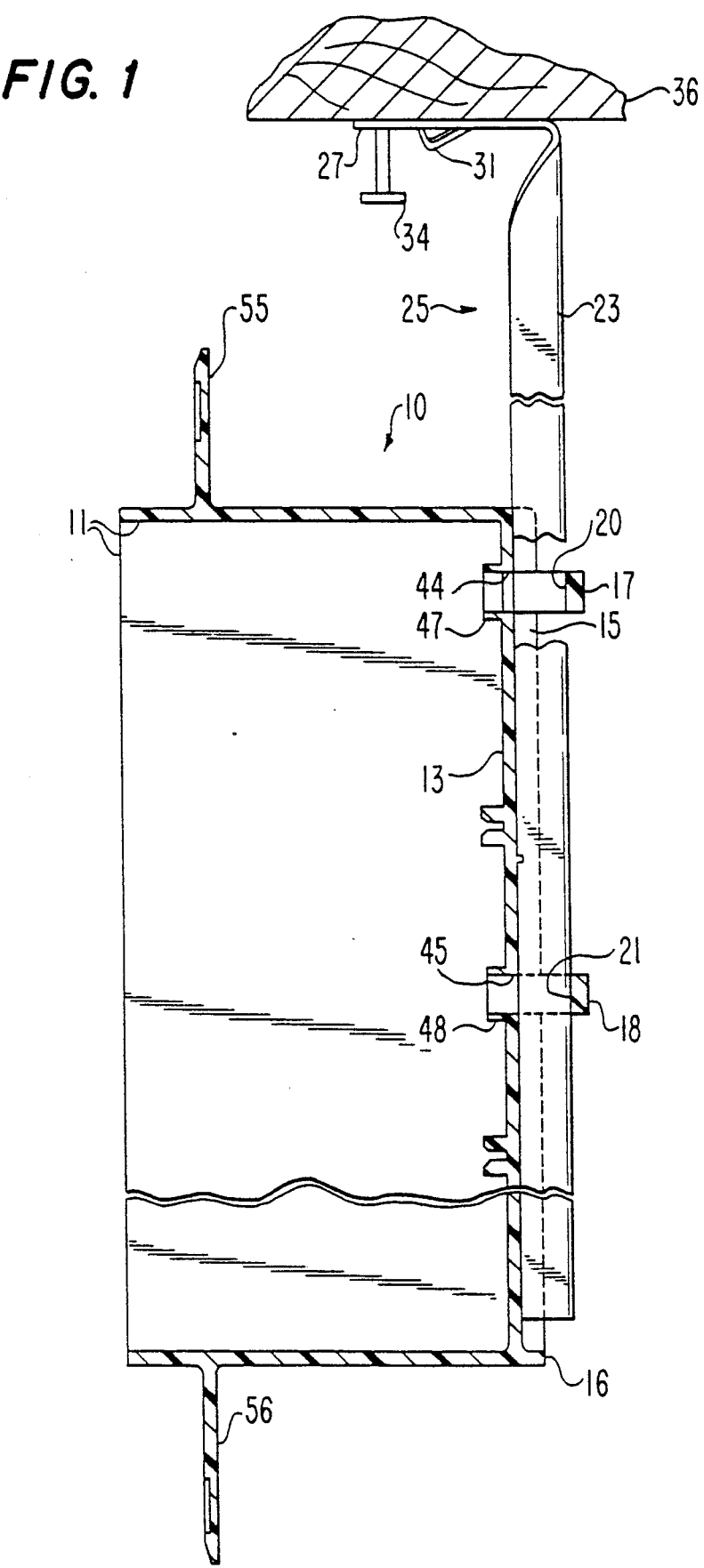
FIG. 1 is a foreshortened side elevation of an apparatus in accordance with the present invention.

FIG. 1 shows an electrical box indicated generally at 10 which is made of molded plastic and which includes side walls 11 and a back wall 13. The front of the box, defined by the distal edges of side walls 11, is open and, as will be described, is provided with edge openings to permit the attachment of electrical devices such as switches, outlets and the like. As will be understood by those skilled in the art, the term "electrical box" refers to a box which is designed to receive electrical devices, wires, and connection devices and is made in accordance with certain specifications so as to be consistent with electrical codes and also to be consistent with the dimensions of devices which are commonly mounted therein.

The majority of box 10 is conventional and will not be described in great detail. However, there are certain features of the box which are unique and particularly important to the present invention.

Among these features is an elongated recess or channel 15 which is formed along the central axis of the back wall of the box, the channel forming part of the rear or outwardly facing surface of the back wall. Channel 15 terminates at an end wall 16. At spaced locations along channel 15 are means defining brackets 17 and 18 which have aligned openings 20 and 21 therethrough to receive an elongated leg 23 of a hanger member indicated generally at 25.

Hanger member 25 is shown apart from the box in FIGS. 2-5 and will be recognized as a portion of a generally conventional hanger arrangement commonly used to support electrical boxes. In addition to elongated leg 23, which is generally U-shaped in cross section, the cross section being substantially uniform throughout its length, the hanger member has an end plate 27 which is flat and is provided with holes 29 to receive fasteners such as nails or screws. An integral cleat 31 is also formed in end plate 27. The cleat is formed from a struck-out portion of the end plate, leaving an opening 32 through which the cleat can pass. The cleat provides a temporary fastener which can be pounded through opening 32 when the hanger is placed in its proper position to temporarily hold the hanger until additional fasteners, such as a nail or screw 34, can be driven or screwed through one or both of holes 29 to permanently attach the hanger. A transition region 34 lies between end plate 27 and elongated leg 23, the hanger member normally being made of a single sheet of metal which is bent to the configuration shown.

Commonly, the hanger member as shown in FIGS. 2-5 is used in conjunction with a very similar member, the elongated leg of which is slightly smaller in dimension than leg 23 so as to be telescopically inserted into leg 23. In the present invention, the other portion, not shown, is not used.

As seen in FIG. 1, the hanger member can be attached by its end plate to a fixed structural member in the wall such as a transverse stud 36 with the elongated leg of the hanger member inserted through openings 20 and 21 of brackets 17 and 18.

Figure 8:
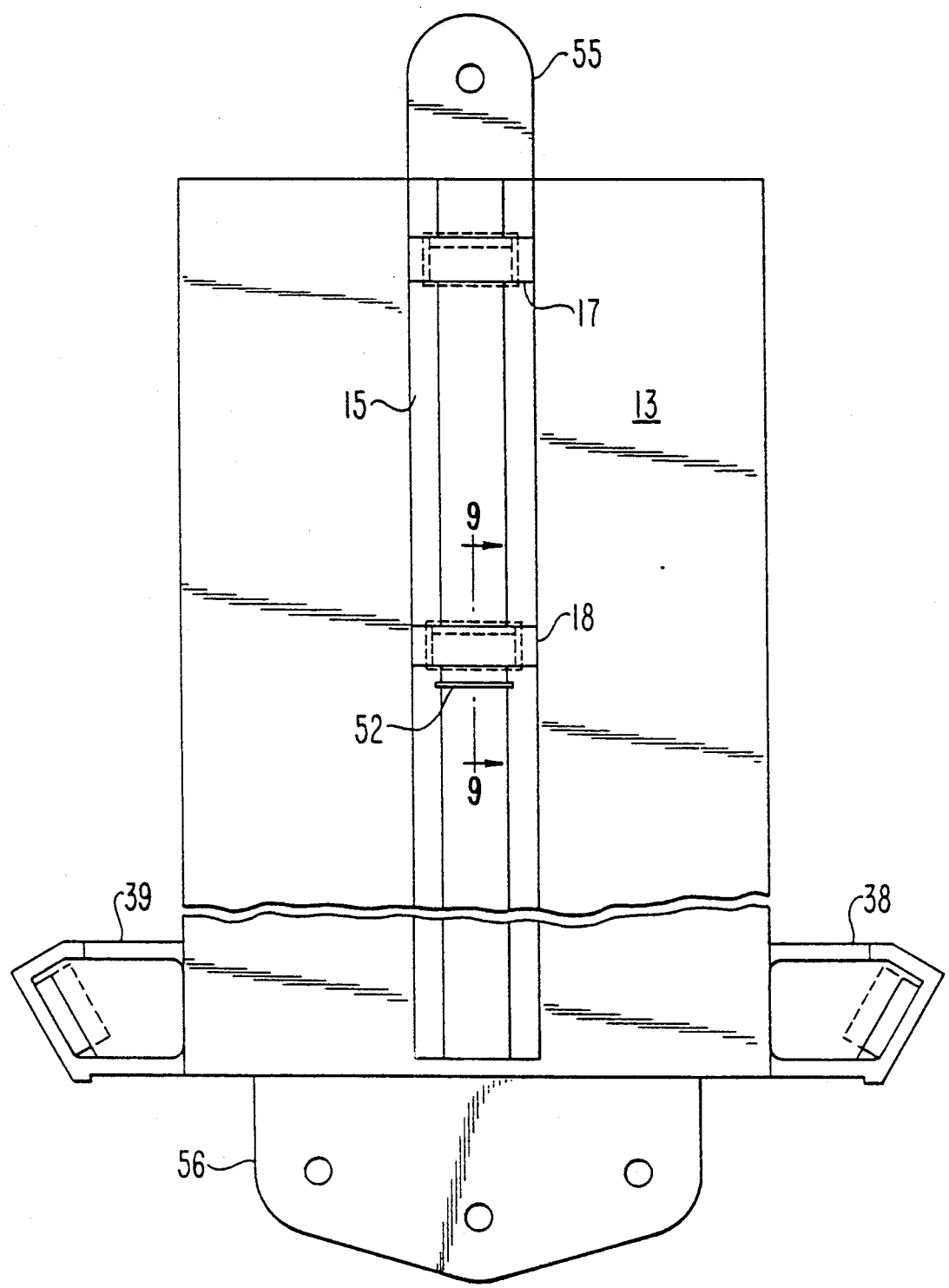
FIG. 8 is a rear elevation of the electrical box of FIGS. 1 and 6 with the hanger bar omitted.

As seen in FIG. 6, which shows a front view of the box looking in through its open front, and as also seen in the rear view of FIG. 8 from which hanger bar 25 has been omitted, the box is provided with laterally extending nail guides 38 and 39 to permit one or two nails to be driven into either an adjacent vertical stud or a horizontally extending stud which either already exists or is added for that purpose. As seen in FIG. 6, walls 11 are provided with bosses 40 having openings to receive fastening screws for the purpose of attaching receptacles, switches or the like in the box. The particular box illustrated is a multi-gang box having adequate room for a plurality of switches or receptacles, a type of box with which the hanger is particularly useful. Barrier supports 42 can be provided to permit the insertion of thin barriers to separate the box into isolated compartments.

Referring particularly to FIGS. 1, 6 and 8, it will be observed that brackets 17 and 18 protrude rearwardly from the box and straddle channel 15. In order to permit formation of these brackets, openings 44 and 45 penetrate the rear wall of the box at positions which are aligned with brackets 17 and 18, respectively. As will be recognized by those familiar with molding techniques, these openings are essential to the formation of the brackets when the box is molded. Relatively short walls 47 and 48 surround openings 44 and 45, respectively, to prevent the possibility of wires within the interior volume of the box defined by the side and back walls from coming in contact with the forwardly facing edges of leg 23 which can be sharp and could possibly damage the insulation on such wires. FIG. 7 shows, in enlarged sectional form, bracket 17 with its associated opening 24 and wall 47 and with leg 23 passing through opening 20 within bracket 17. As will be recognized, wall 47 provides effective isolation between the wires and the distal edges of leg 23.

In order to keep the hanger in position and to permit its insertion into openings 20 and 21, additional features are provided on the box. Attention is directed to FIG. 9 which shows, in enlarged, sectional form, another view of bracket 18 with its associated opening 45 and surrounding wall 48. As will be recognized from the other figures, including FIG. 7, each bracket is formed with side legs extending away from the back wall on opposite sides of channel 15 and a transverse leg joining the distal ends of the side legs. As seen in FIG. 9, the transverse leg, which is shown in section, has an inner surface 49, one edge 50 of which is chamfered at an angle of about 15°. This chamfered surface faces in the direction from which leg 23 of the hanger bar is inserted, providing a bevel which facilitates the initial insertion of the end of leg 23.

In addition, a transverse rib 52, seen in FIGS. 8 and 9, is formed across the deepest portion of channel 15. This rib is quite small, typically protruding only about 0.030 in. and having a width of between about 0.010 and 0.015 in., but is sufficient to engage the distal edges of leg 23 as it is inserted, frictionally engaging those edges and holding the leg in position relative to the box. A typical position of leg 23 is shown in FIG. 9, more accurately than can be illustrated in FIG. 1, showing the possibility that the distal edge, which is the upper most edge in FIG. 9, can cut into rib 52 as the hanger bar is inserted. Thus, the rib engages the edges with considerable friction, holding the hanger bar relative to the box, or vice versa, with significant frictional force, quite adequate to prevent inadvertent separation of the components. Rib 52 is positioned "down stream" from the second bracket 18, in terms of the direction of insertion of the bracket, so that insertion through openings 20 and 21 is not impeded. After that insertion, leg 23 engages rib 52 and is securely retained. The assembly can be thus positioned and shipped with this frictional engagement keeping the members assembled and can be installed with this engagement continuing to keep the components together until the box can be otherwise attached to surrounding structures.

The box is also provided with end ears 55 and 56 having openings therethrough to receive fasteners for the attachment of the box to drywall sheathing or other materials in a conventional fashion.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for mounting an electrical box in a building wall or the like, the box being of the type having side walls, a back wall and an open front, the apparatus comprising the combination of
    a generally L-shaped hanger having an end adapted to be attached to a structural member in the building wall and an elongated leg of substantially uniform cross section;
    means on the back wall of said box defining first and second openings dimensioned to receive said elongated leg therethrough, said openings being aligned with each other along an axis generally parallel with said back wall;
    means defining a channel recessed into said back wall and extending generally parallel with said axis, said channel having an open end for receiving said elongated leg and a closed end limiting insertion of said elongated leg into said channel, said means defining said openings being spaced along said channel, and
    means on said box along said channel for frictionally engaging said elongated leg extending through said openings.

2. An apparatus according to claim 1 wherein each of said means defining an opening comprises a generally U-shaped bracket having side legs extending away from said back wall on opposite sides of said channel and a transverse leg joining the distal ends of said side legs.

3. An apparatus according to claim 2 wherein said means for frictionally engaging said leg comprises a transverse rib in said channel adjacent one of said openings for decreasing the cross-sectional area of the channel to thereby engage a surface of said leg.

4. An apparatus for mounting an electrical box in a building wall or the like, the box being of the type having side walls, a back wall and an open front, the apparatus comprising the combination of
    a generally L-shaped hanger having an end adapted to be attached to a structural member in the building wall and an elongated leg of substantially uniform cross section;
    means on the back wall of said box defining first and second openings dimensioned to receive said elongated leg therethrough, said openings being aligned with each other along an axis generally parallel with said back wall; and means defining a hole through said back wall adjacent each said opening so that each said opening communicates with the interior of said box;
    a wall surrounding each said hole and extending away from said back wall toward the open front of said box to prevent contact of wires contained within said box with said elongated leg; and
    means on said box for frictionally engaging said elongated leg extending through said openings.

5. An apparatus according to claim 4 wherein said means for frictionally engaging said leg comprises a transverse rib adjacent one of said openings for decreasing the cross-sectional area to thereby engage a surface of said leg.

6. An apparatus according to claim 4 and further comprising mans defining a channel recessed into said back wall, said channel having an open end for receiving said elongated leg and a closed end limiting insertion of said elongated leg into said channel, said means defining said openings being spaced along said channel.

* * * * *